United States Patent

[11] 3,627,148

[72] Inventor Edwin A. Hediger
Fairport, N.Y.
[21] Appl. No. 882,515
[22] Filed Dec. 5, 1969
[45] Patented Dec. 14, 1971
[73] Assignee Eastman Kodak Company
Rochester, N.Y.

[54] ASSEMBLY DEVICE
5 Claims, 8 Drawing Figs.

[52] U.S. Cl. .......... 214/1 BD, 214/147 T
[51] Int. Cl. .......... B66c 1/10
[50] Field of Search .......... 214/1 B, 1 BU, 1 BC, 1 BH, 1 BD, 1 BV, 147 T

[56] References Cited

UNITED STATES PATENTS 3,306,471 2/1967 Devol .......... 214/1 B 3
3,479,716 11/1969 Zanger .......... 214/1 BS 2 X
3,507,403 4/1970 Moore .......... 214/1 B 4

*Primary Examiner*—Gerald M. Forlenza
*Assistant Examiner*—George F. Abraham
*Attorneys*—Robert W. Hampton and Steve W. Gremban ABSTRACT: An assembly device having a reciprocally and pivotally movable workpiece holding mechanism for transferring a component or workpiece from a supply station to a work station where it is subjected to an assembly operation. The supply station is located in a plane transverse to the plane in which the work station is located, and when the workpiece holding mechanism of the assembly device is moved between the supply and work stations, it traces a path having an initial linear portion, an arcuate portion and a terminal linear portion.

EDWIN A. HEDIGER
INVENTOR.

BY Steve W. Greenbaum
Robert W. Hampton
ATTORNEYS

Patented Dec. 14, 1971

3,627,148

3 Sheets-Sheet 2

EDWIN A. HEDIGER
INVENTOR.
BY Steve W. Gremban
Robert W Hampton
ATTORNEYS

EDWIN A. HEDIGER
INVENTOR.

BY Steve W. Grembau
Robert W. Hampton
ATTORNEYS

ASSEMBLY DEVICE

BACKGROUND OF THE INVENTION

1. Field of the Invention

This invention relates generally to article transfer or feeding mechanisms, and more specifically to any assembly device for transferring components or work pieces from a supply station to a work station.

2. Description of the Prior Art

In the commercial production of many articles, various forming, stamping, punching, grinding, polishing, assembling and other operations may be required, and such operations are often performed in sequence in a single machine, or in a battery of different machines, with the workpieces moving from work station to work station for the various operations. In addition, at one or more of the work stations it may be necessary to pick up a component or part from a supply station and transfer it to the work station or to a workpiece comprising an assembly of parts at the work station. Although assembly devices for accomplishing transfer operations are known, such devices for transferring components between supply and work stations located on planes transverse to one another such as a supply station located on an inclined feed track and a work station that is horizontally oriented, are of complicated design and construction.

SUMMARY OF THE INVENTION

This invention includes within its scope a transfer device for transferring a component or workpiece from a supply station to a work station in which the stations are located on planes transverse to one another. Such transfer device is particularly adaptable to automatic assembly operations in which a component or workpiece is moved from a supply station on an inclined track to a workpiece or component holding and locating fixture at a horizontally oriented work station, and the work pieces are advanced sequentially through work stations as machine or assembly operations are performed on the work pieces. The transfer device has a reciprocally and pivotally movable work piece holding mechanism movable along a path having an initial linear portion, an arcuate portion and a terminal linear portion as the mechanism is moved between the supply and work stations.

It is therefore an object of the present invention to provide a transfer device for transferring a component or part from a supply station located on an inclined track to a horizontally oriented work station.

Another object of the invention is to provide a transfer device for transferring a component or part from a supply station to a work station in which the stations are located on planes transverse to one another.

Still another object of the present invention is to provide a transfer device for transferring a component or part between two stations, the transfer device being of simple design and construction, thoroughly reliable and efficient in operation, and economical to manufacture.

The invention and its objects and advantages will become more apparent from the detailed description of the preferred embodiment presented below.

BRIEF DESCRIPTION OF THE DRAWING

In the detailed description of the preferred embodiment of the invention presented below, reference is made to the accompanying drawings, in which.

DESCRIPTION OF THE PREFERRED EMBODIMENT

Because automatic assembly systems are well known, the present description will be directed in particular to elements forming part of or cooperating more directly with the present invention, assembly apparatus not specifically shown or described herein being understood to be selectable from those known in the art.

Figures 1, 2:
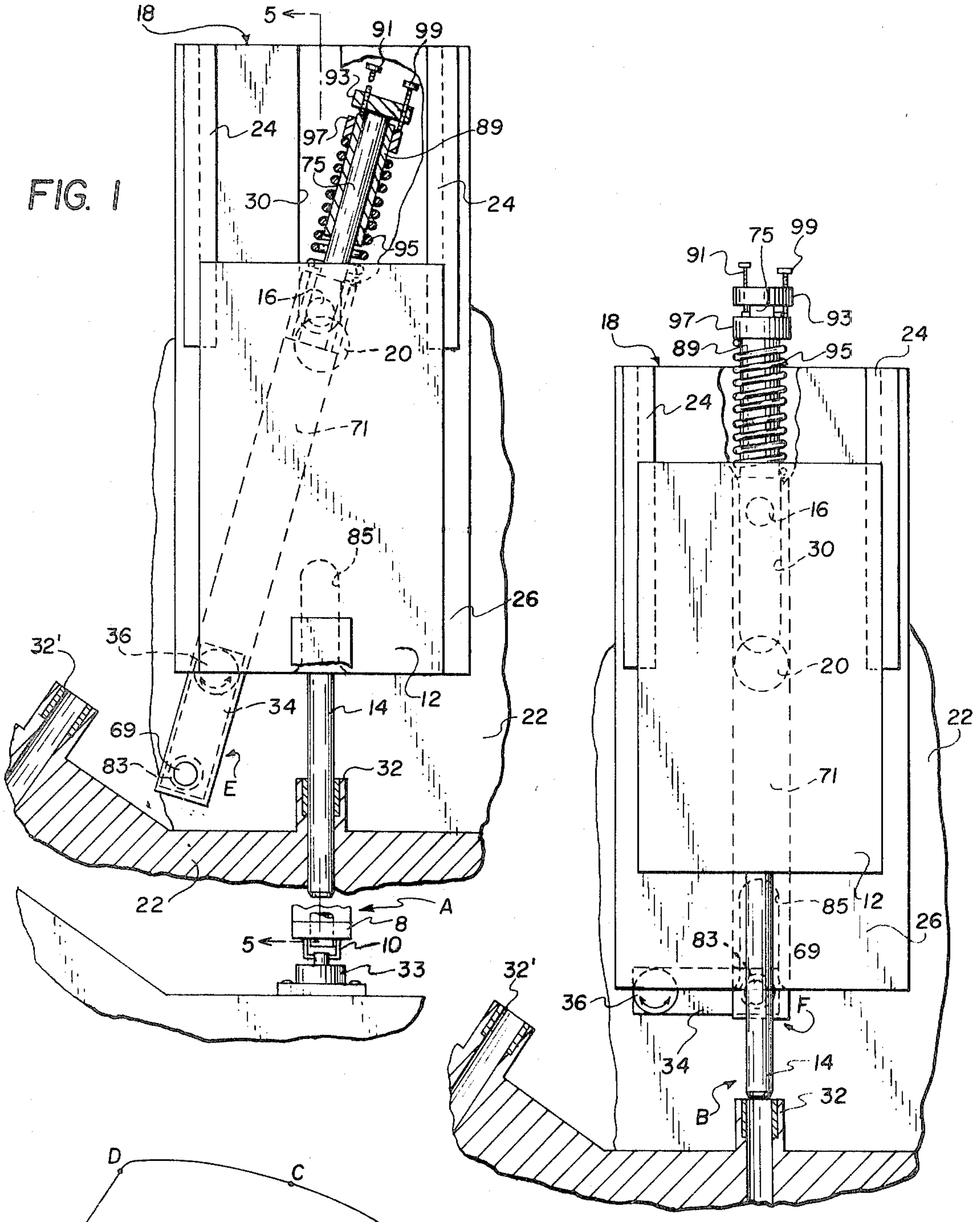
FIG. 1 is a segmental front elevational view, with parts broken away and other parts sectioned, of a transfer device of this invention at a work station position for transferring a tool or a component or both to a workpiece at the work station.
FIG. 2 is a view similar to FIG. 1 showing the transfer device in a position in which the tool or component holding mechanism is substantially at position B of FIG. 1A.
Figures 3, 4:
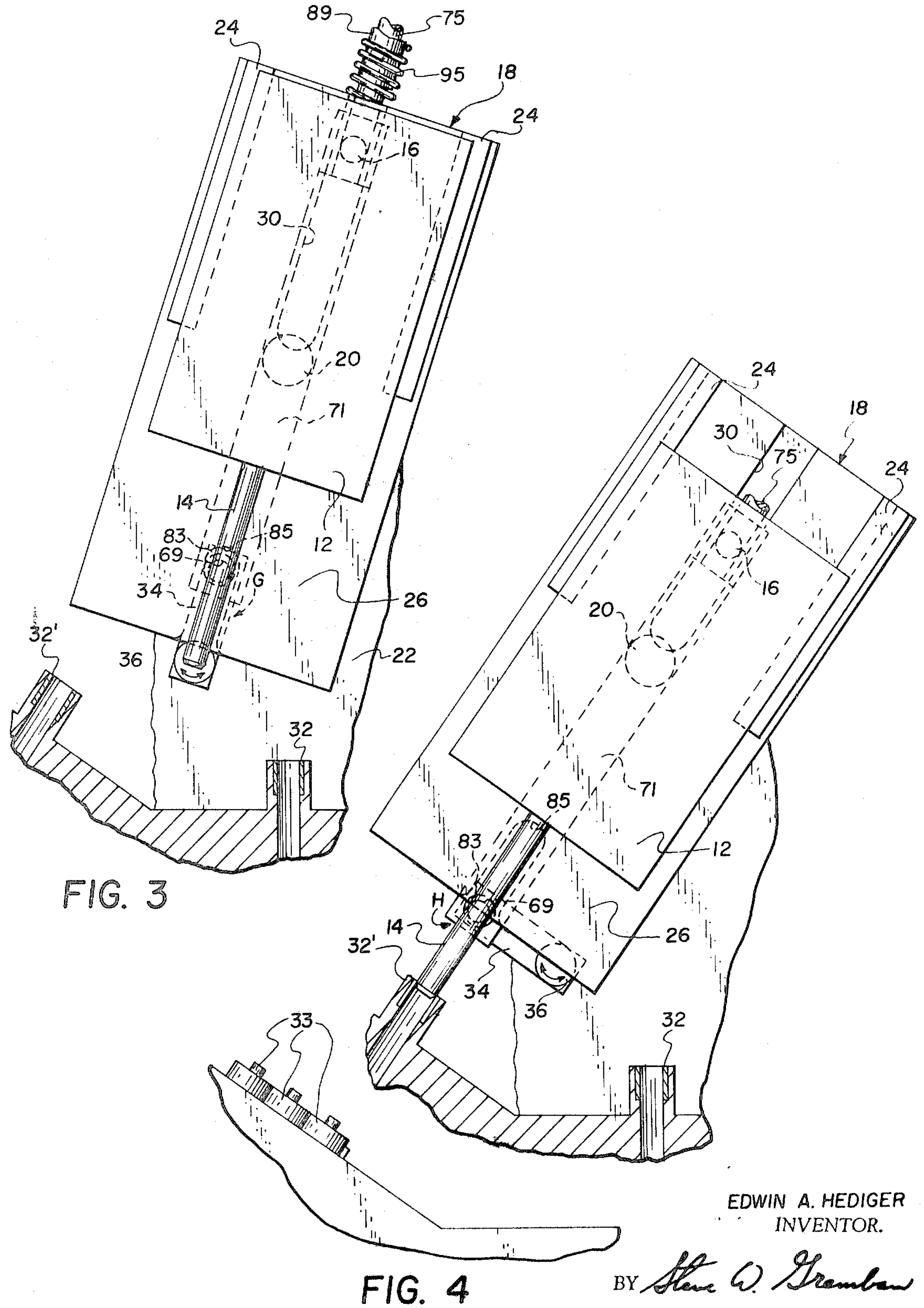
FIG. 3 is a view similar to FIG. 1 showing the transfer device in a position in which the tool or component holding mechanism is at the position C of FIG. 1A substantially intermediate the supply and work stations.
FIG. 4 is a view similar to FIG. 1 showing the transfer device in a position in which the tool or component holding mechanism is substantially at position D of FIG. 1A.
Figures 5, 6, 7:
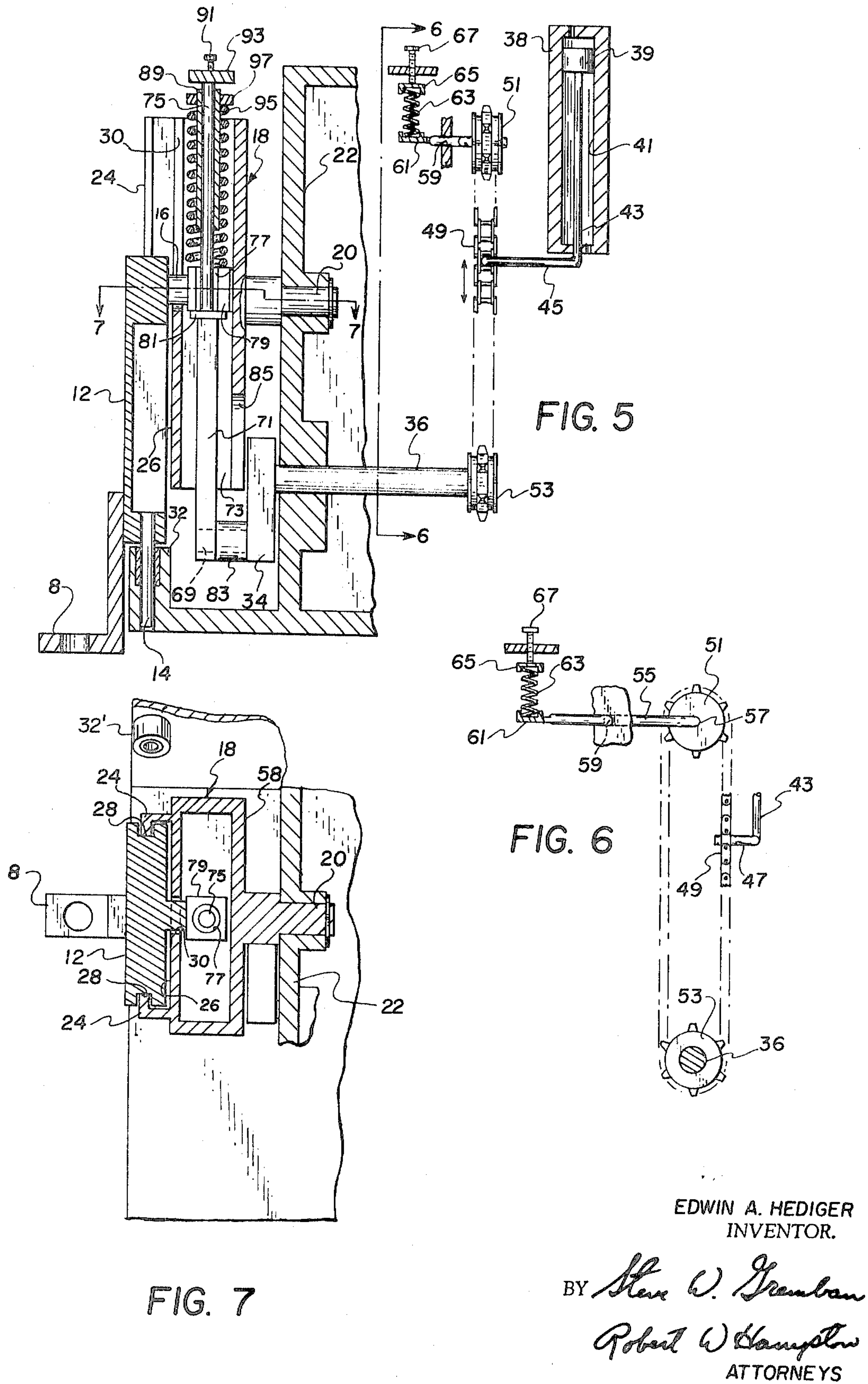
FIG. 5 is a section view taken along line 5—5 of FIG. 1.
FIG. 6 is a side elevation view of a portion of the transfer device of FIG. 5 taken from line 6—6 of FIG. 5.
FIG. 7 is a section view taken along line 7—7 of FIG. 5.

The transfer device of this invention comprises a mounting bracket 8 as best seen in FIG. 5 for supporting any suitable assembly tool, such as pickup jaws 10 shown in FIG. 1, a vacuum pickup mechanism, a power tool such as a screwdriver, an ultrasonic head, etc., the latter not shown. The mounting bracket 8 is secured to a reciprocally movable tool holding mechanism such as a carriage 12 having a locating rod 14 secured to one end, and a shaft 16 secured to its other end about which carriage 12 pivots. A control mechanism for controlling reciprocal and pivotal movement of carriage 12 and tool 10 comprises a hollow, substantially rectangular, boxlike housing 18 mounted for pivotal movement on a shaft 20 supported by a fixed frame member 22. The housing 18 has spaced rails 24 of L-shaped cross section on its front wall 26 as best seen in FIG. 6, the rails cooperating with grooved ways 28 on the sides of carriage 12 for supporting the carriage and shaft 16 for reciprocal movement, with shaft 16 moving within a slot 30 in wall 26. The carriage 12 and tool 10 are held in either a work station position as seen in FIG. 1 or a supply station position as seen in FIG. 4 by angularly spaced bushings 32, 32′ respectively mounted in frame 22 for slidably receiving locating rod 14. At the work station position, the housing 18 and carriage 12, mounting bracket 8 and tool 10 guided thereby are held by rod 14 and bushing 32 in a vertically oriented position. At the supply station, the housing 18 and carriage 12, bracket 8 and tool 10 carried thereby are held by rod 14 and bushing 32′ in an inclined position.

The drive mechanism for plate 12 and housing 18, as best seen in FIGS. 5 and 6, comprises a crank 34 secured to a shaft 36 journalled in frame member 22, and driven alternately in clockwise and counterclockwise rotation through 360° from a predetermined position by any suitable air cylinder or other drive motor 38. The air cylinder 38 as seen in FIG. 5 has a piston 39 movable within a cylinder 41 by any suitably valved air pressure system, not shown. A piston rod 43 secured to piston 39 has an arm 45 with a claw 47 at one end engageable with a link of a chain 49 for moving the chain in one direction or the other depending upon the direction of movement of piston 39. Chain 49 is trained over an idler gear 51 and a drive gear 53 secured to shaft 36 for alternately driving crank 34 through one revolution upon movement of chain 49. The chain 49 is provided with an automatic backlash takeup means comprising an arm 55 having a stud shaft 57 for rotatably supporting gear 51. Arm 55 has a bent shaft portion 59 about which it is pivotally mounted, and a flange 61 at one end for supporting a helical spring 63. The spring 63 is interposed between flange 51 and a cap 65 which is adjustable by screw 67 for varying the spring force. Spring 63 urges arm 55 and gear 51 in a clockwise direction, thereby eliminating any backlash that may develop in the chain and gears due to chain and gear wear, and assures repeatability of operation of crank 34 from a predetermined position.

Figure 1A:
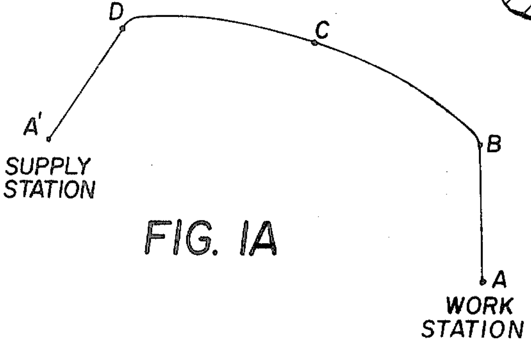
FIG. 1A is a view showing by a full line the path of the tool or component holding mechanism as it is moved between the supply and work stations.

The crank 34 has an eccentric pin 59 for rotatably supporting one end of a connecting rod 71. The connecting rod extends through an opening 73 in housing 18, and has a cylindrical portion 75 entending through a bushing 77 in a collar 79 at one end of shaft 16. Connecting rod 71 further has a shoulder 81 at one end of cylindrical portion 75 engageable by collar 79 and bushing 77. Movement of crank 34 and a bushing 83 mounted on pin 69 from position E as seen in FIG. 1 causes connecting rod 71 and slide plate 12 to be moved upwardly within housing 18 with plate 12 and any bracket 8 or tool 10 carried thereby to follow a path of movement from A to B depicted in FIG. 1A. Movement of crank 34 and bushing 83 from position E to F (see FIG. 2) results in vertical movement of tool 10, and at this point bushing 83 enters a slot 85 in a rear housing wall 87 and locating rod 14 clears the top of bushing 32. Further movement of crank 34 and bushing 83 from position F to G (see FIG. 3) causes further movement of slide plate 12 relative to housing 18 and pivotal movement of the housing through a predetermined angle by virtue of the bushing 83 and slot 85 connection. Movement of crank 34 and bushing 83 from position G to H (see FIG. 4) continues pivotal movement of housing 18 to a position in which locating rod 14 of slide plate 12 is in alignment with inclined bushing 32′ and permits slight downward movement of slide plate 12 relative to housing 18. In this position, bushing 83 leaves housing slot 85, and locating rod 14 is beginning to enter bushing 32′, thus retaining complete control over housing 18 and plate 12 at all times. Continued movement of crank pin 69 from H to A′ completes a single revolution of 360° and causes plate 12 and locating rod 14 to be moved along the inclined path to its supply station position is which the part carrier or tool 10 may engage a part of component 33. Rotation of crank 34, crank pin 69 and bushing 83 through a single revolution in the opposite direction causes tool 10 to follow the path A′DCBA (see FIG. 1A) from the supply station position to the work station position and to deposit the part or component 33 at the work station.

The assembly device is provided with a safety mechanism to prevent damage to the device in the event plate 12 or mounting bracket 8 or tool 10 carried thereby should strike an abutment as the device is moved to either of its supply and work station positions. The safety mechanism comprises a sleeve 89 encircling and slidably movable on cylindrical rod 75. An adjusting screw 91 carried by a flange 93 at one end of rod 75 engages an end of sleeve 89 and varies the opposite end position of sleeve 89 relative to the faces of collar 79 and bushing 77 for varying the amount of play or lost motion between the end of sleeve 89 and the end faces of collar 79 and bushing 77. A spring 95 encircles sleeve 89 and has one end bearing against the end faces of collar 79 and bushing 77, and a ring 97 engaging the other end, as best seen in FIGS. 1 and 5. The ring 97 is axially movable by an adjusting screw 99 carried by flange 93 to adjust the spring force. Should plate 12, mounting bracket 8 or tool 10 strike an abutment, continued downward movement of connecting rod 71 as crank 34 and crank pin 69 reaches its final position at either the work or supply station causes ring 97 to depress spring 95 and take up the lost motion between the end of sleeve 89 and the adjacent end faces of collar 79 and bushing 77. For operations such as bending or cutting of parts, where no lost motion is desired, a rigid connection between the sleeve 89 and collar 79 and bushing 77 is achieved by adjusting screw 91 until the end of sleeve 89 engages the end faces of collar 79 and bushing 77.

The invention has been described in detail with particular reference to a preferred embodiment thereof, but it will be understood that variations and modifications can be effected within the spirit and scope of the invention.

I claim:

1. In an assembly device for moving an object from a first position to a second position, the combination comprising:
- a frame including means forming spaced openings at said first and second positions, respectively;
- a first member having means for releasably holding an object, said first member being mounted for pivotal and reciprocal movement to move the object from said first position to said second position and including:
  - a locating rod selectively engageable with said spaced openings for guiding said first member for reciprocal movement to and from each of said first and second positions, and
  - means for supporting said first member for pivotal movement about a shaft;
- a second member for effecting pivotal movement of said first member, said second member including:
  - a housing having spaced flanges for engaging opposite sides of said first member, and
  - means defining a slot;
- means selectively coupled to said first and second members for moving said members in timed relation to cause said first member to move the object from said first position to said second position, said moving means including a rotatable crank having a crankpin for engaging said slot and pivotally moving said housing; and
- a connecting rod for connecting said crankpin to said shaft for reciprocally moving said first member.

2. The invention according to claim 1, wherein a safety mechanism is interposed between said first member and said connecting rod.

3. The invention according to claim 1, wherein a safety mechanism is interposed between said first member and said connecting rod, said safety mechanism comprising a spring for biasing said first member into engagement with said connecting rod.

4. The invention according to claim 1 wherein a safety mechanism is interposed between said first member and said connecting rod, said safety mechanism comprising a spring for biasing said first member into engagement with said connecting rod, said device further having a disabling means for disabling the safety mechanism.

5. The invention according to claim 4, wherein said disabling means comprises a sleeve on said connecting rod, interposed between said connecting rod and said first member, and adjusting means for said sleeve for rigidly connecting said first member to said connecting rod.

* * * * *